(12) United States Patent
de Grasse

(10) Patent No.: US 9,719,541 B2
(45) Date of Patent: Aug. 1, 2017

(54) ROTATABLE CONNECTOR ASSEMBLY

(71) Applicant: Aqua-Leisure Industries, Inc., Avon, MA (US)

(72) Inventor: Scott R. de Grasse, Marshfield, MA (US)

(73) Assignee: Aqua-Leisure Industries, Inc., Avon, MA (US)

( * ) Notice: Subject to any disclaimer, the term of this patent is extended or adjusted under 35 U.S.C. 154(b) by 0 days.

(21) Appl. No.: 15/220,541

(22) Filed: Jul. 27, 2016

(65) Prior Publication Data

US 2017/0097032 A1    Apr. 6, 2017

Related U.S. Application Data

(60) Provisional application No. 62/236,221, filed on Oct. 2, 2015.

(51) Int. Cl.
| | | |
|---|---|---|
| A47C 4/54 | (2006.01) | |
| F16B 12/12 | (2006.01) | |
| A47C 1/14 | (2006.01) | |
| A47C 7/42 | (2006.01) | |

(52) U.S. Cl.
CPC .............. *F16B 12/12* (2013.01); *A47C 1/143* (2013.01); *A47C 1/146* (2013.01); *A47C 4/54* (2013.01); *A47C 7/42* (2013.01)

(58) Field of Classification Search
CPC  B60C 29/00; A47C 4/54; B65D 41/06; F16K 15/20; F16K 15/202; F16K 15/205
See application file for complete search history.

(56) References Cited

U.S. PATENT DOCUMENTS

| | | | | | |
|---|---|---|---|---|---|
| 1,399,345 | A | * | 12/1921 | Henry ................ | B60K 15/0406 220/302 |
| 3,572,836 | A | * | 3/1971 | Khanh ..................... | A47C 4/54 297/440.1 |
| 4,437,790 | A | * | 3/1984 | Trop ....................... | B63C 9/155 114/315 |
| 6,942,255 | B2 | * | 9/2005 | Pickering .............. | F16L 37/008 285/136.1 |
| 7,066,442 | B2 | * | 6/2006 | Rose ....................... | F16K 15/20 137/223 |
| 8,857,647 | B2 | * | 10/2014 | Nakamura ......... | B65D 43/0231 215/332 |
| 9,433,301 | B2 | * | 9/2016 | Brechet ................ | A47C 27/086 |

* cited by examiner

*Primary Examiner* — Daniel Wiley
(74) *Attorney, Agent, or Firm* — Wolf, Greenfield & Sacks, P.C.

(57) ABSTRACT

This invention relates to a rotatable connector assembly, also referred to as a two-part connector assembly that allows connection of one object or member bearing one part of the assembly to another object or member bearing the other part of the assembly, and further allows rotation of the members with respect to each other in a plane parallel to the plane of the assembled connector, assures that the two connector members remain attached under load and shear forces, and permits ready detachment of the connector members from each other.

18 Claims, 4 Drawing Sheets

ROTATABLE CONNECTOR ASSEMBLY

RELATED APPLICATIONS

This application claims priority under 35 U.S.C. §119(e) to U.S. Provisional Patent Application Ser. No. 62/236,221, filed Oct. 2, 2015 and entitled "ROTATABLE DETACHABLE CONNECTOR ASSEMBLY," which is incorporated herein by reference in its entirety for all purposes.

TECHNICAL FIELD

Assemblies and methods for mechanically connecting and detaching separate components are generally described. In particular, assemblies and methods are described for use with an inflatable lounge.

BACKGROUND

Different assemblies and methods for mechanically connecting separate components including those of an inflatable lounge are known. However, these assemblies are often overly-complex, or if they are easily attachable they tend to be difficult to detach or prone to unwanted detachment.

Accordingly, there is a need for alternative assemblies.

SUMMARY

Assemblies and methods for mechanically connecting and detaching separate components are generally described.

According to one more embodiments, a rotatable connector assembly is provided. The rotatable connector assembly may comprise a first connector member and a second connector member. The first connector member may comprise a cylindrical body having one or more protrusions extending radially therefrom. The second connector member may comprise a cylindrical body having a perimetral rim at an upper edge of the cylindrical body. The perimetral rim may have one or more slots therein for corresponding receipt of each of the one or more protrusions. The one or more protrusions in the first connector member may be configured to fit beneath the perimetral rim of the second connector member when the one or more protrusions are inserted fully into the one or more slots of the second connector member, so that the first connector member may be rotated relative to the second connector member.

According to one or more embodiments an inflatable lounge is provided. The inflatable lounge may comprise an inflatable body; an inflatable cushion; and a rotatable connector assembly, such as the one described above, having a first connector member attached to one of the inflatable body and the inflatable cushion, and a second connector member attached to the other of the inflatable body and the inflatable cushion.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Assemblies and methods for mechanically connecting separate components are generally described.

According to one or more embodiments, a rotatable connector assembly is disclosed. The rotatable connector assembly may be a two-part assembly. The rotatable connector assembly may comprise a first connector member and a second connector member. The first connector member may comprise the male part of the two-part assembly. The second connector member may comprise the female part of the two part assembly.

The first connector member may comprise a cylindrical body having a one or more protrusions (e.g., teeth) extending radially therefrom. The protrusions may extend radially outwardly from the cylindrical body, for example as in the embodiment shown in FIG. 1, or may alternatively extend radially inwardly from the cylindrical body.

The second connector member may comprise a cylindrical body. The cylindrical body may have a perimetral rim (a rim surrounding the perimeter) at its upper edge. The perimetral rim may have one or more slots therein for corresponding receipt of each of the one or more protrusions.

According to one or more embodiments, when the first, or male, connector member is mated with the second, or female, connector member, the two members may be rotated relative to each other. Once the protrusions on the first connector part are rotated away from the slots on the second connector member, a perimetral rim extending beyond the perimeter of the first connector member cooperates with the perimetral rim on the upper edge of the second connector member to keep the two members in close association with each other while the two members may be rotated relative to each other. In some embodiments, the two members are rotatable through a full 360 degree range of motion. Alternatively, in some embodiments the two members may be rotatable through a limited range of motion of less than 360 degrees, for example, 90 degrees, to aid in positioning articles attached to the two members into a desired orientation.

The two connector members may be detached from each other by rotation of the parts until the protrusions in the first connector member are re-aligned with the slots in the second connector member, so that the two connector members may then be pulled apart.

One application of the instant invention involves the rotatable attachment of a cushion to an inflatable lounge, the invention facilitating the ready attachment and detachment of the cushion from the lounge as desired while assuring that the two parts of the connector remain attached under load and shear forces.

Figure 1:
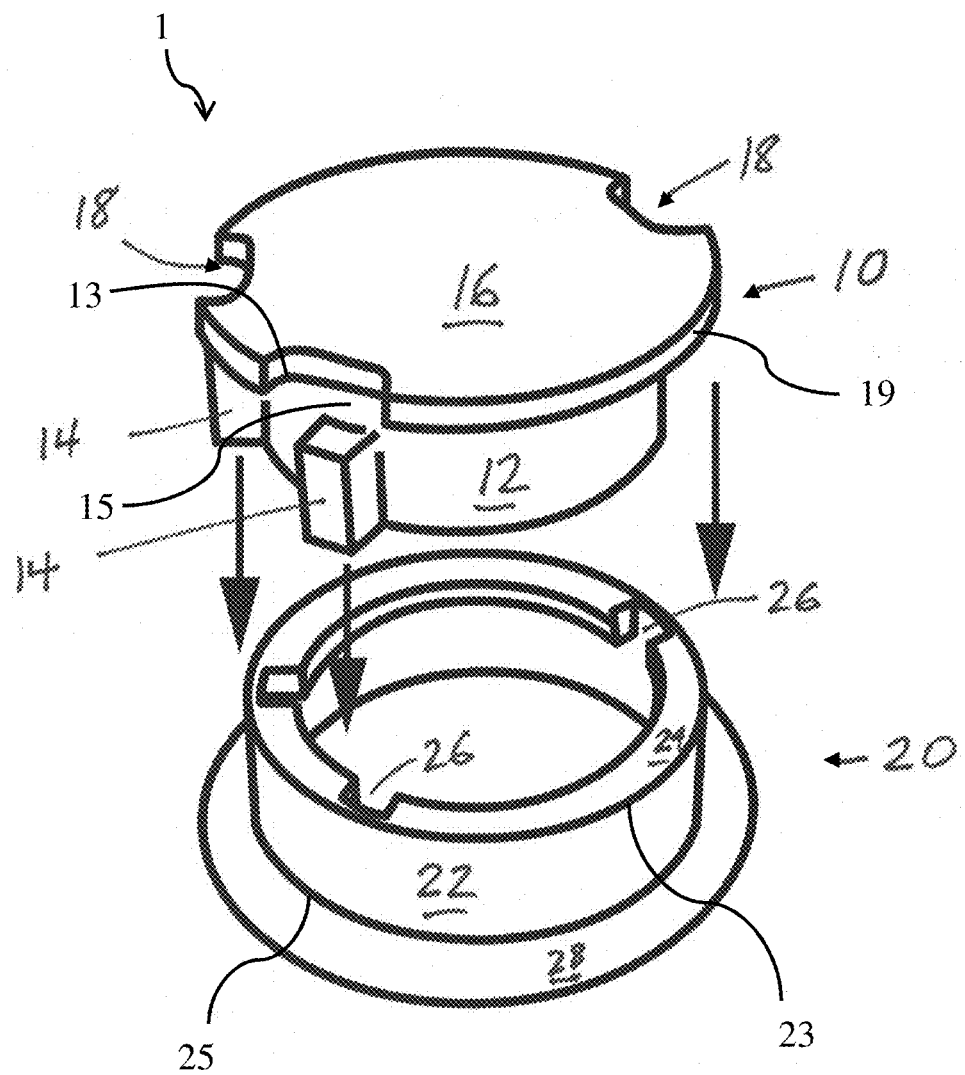
FIG. 1 is a perspective view of a rotatable connector assembly in accordance with the instant invention, with the first (male) connector member shown above the second (female) connector member.

In FIG. 1, the rotatable connector assembly 1 of the instant invention comprises a first connector member 10 (i.e., male part) and a second connector member 20 (i.e., female part).

The first connector member 10 comprises a cylindrical body 12 having protrusions 14 extending radially therefrom. Two such protrusions 14 may be seen in FIG. 1, and an unseen third protrusion extends from the rear of the cylindrical body 12. Different embodiments may have a different number of protrusions. A perimetral rim 19 extends from an upper edge 13 of the cylindrical body 12. The protrusions 14 may be spaced apart from the perimetral rim 19. For example, a spaced region 15 may separate the top surface of a protrusion 14 from a bottom surface of the perimetral rim 19. The plurality of protrusions 14 may be sufficiently spaced apart from the perimetral rim 19 of the first connector member 10 such that a perimetral rim 24 of the second connecter member 20, described below, may fit between the plurality of protrusions 14 and the perimetral rim 19 of the first connector member 10. For the sake of simplicity and clarity, the disclosed embodiments are generally described with the first connector member 10 positioned above the second connector member 20. It should be understood, however, that changing the positions or directions of the two members 10 and 20 would not affect the scope of the invention.

The embodiment shown in FIG. 1 further comprises optional cut-out areas 18 situated in the perimetral rim 19, with each of the cut-out areas 18 positioned above situated above each protrusion 14, which may facilitate ready location of the protrusions 14 for alignment with the corresponding slots 26 in the second connector member 20, as described below. An optional plate 16 extends across the top of cylinder 12. The plate 16 may be flat, as shown, or curved (e.g., concave or convex). The plate 16 may be integral with the perimetral rim 19.

The second, or female, connector member 20 of the rotatable connector assembly 1 comprises a cylindrical body 22 having a perimetral rim 24 at an upper edge 23 of the cylindrical body 22. Slots 26 formed in the perimetral rim 24 are adapted for receipt of the protrusions 14 of the first connector member 10. The perimetral rim 24 may extend inwardly as shown in FIG. 1, or may, in alternative embodiments not shown, extend outwardly. An optional ring portion 28 extends radially around a lower edge 25 of the cylindrical portion 22.

According to certain embodiments, for example, the embodiment shown in FIG. 1, the protrusions 14 of the first connector member 10 may be not all equally spaced apart around the cylindrical body 12, such that the plurality of protrusions 14 align with the slots at a single orientation between the first connector member and the second connector member. This unequal spacing ensures that the two connector members 10 and 20 may be detached from each other at only a single position, thus making it less likely that the two connector members 10 and 20 are inadvertently separated, in operation.

Figure 2:
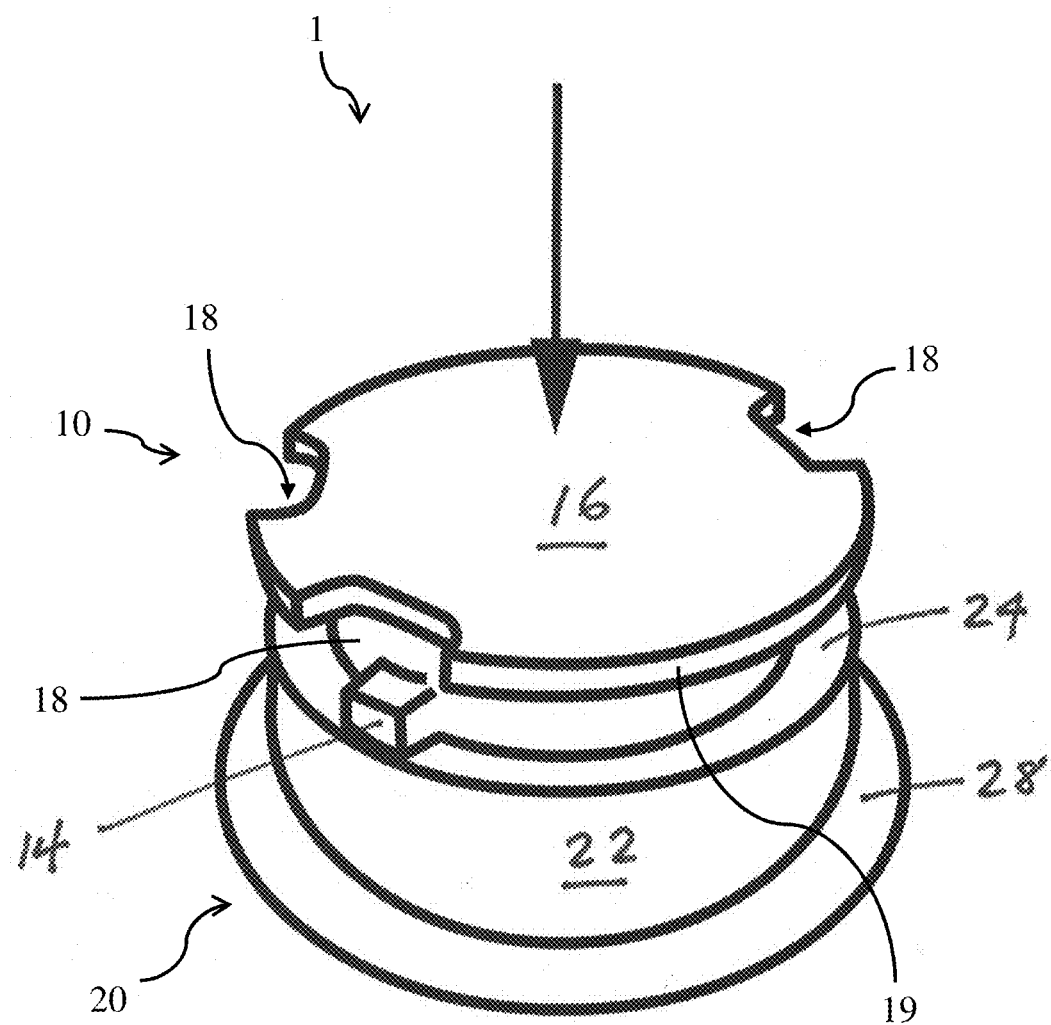
FIG. 2 is a perspective view of the rotatable connector assembly of FIG. 1, in which the male connector member has been positioned with its protrusions partially inserted into the slots in the second connector part.

FIG. 2 depicts the first connector member 10 (i.e., the male connector part) partly mated with the second connector member 20 (i.e., the female connector part), the protrusions 14 of the former being partially inserted into the slots 26 of the latter.

Figure 3:
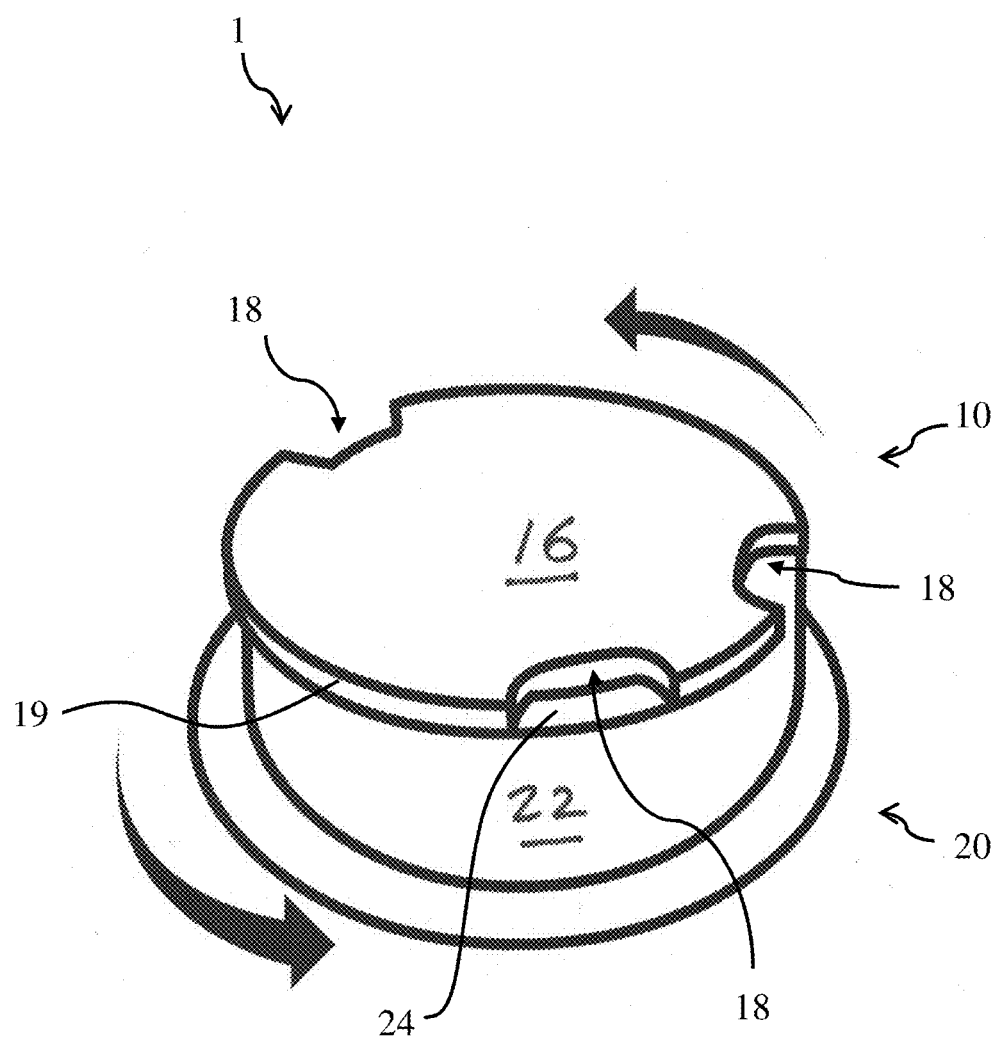
FIG. 3 is a perspective view of the rotatable connector assembly of FIG. 1, in which the male connector part has been fully mated with the female connector part, so that the two parts may be rotated with respect to each other.

FIG. 3 depicts the two connector members 10 and 20 mated together and rotatable with respect to each other. As discussed above and as can be seen in FIG. 1, protrusions 14 of male connector part 10 extend only part way up the wall of cylinder 12, and the protrusions 14 are therefore spaced apart from the perimetral rim 19. As a result of this configuration, when the first connector member 10 (i.e., the male part) is fully mated with the second connector member 20 (i.e., the female part), protrusions 14 are rotatable below the rim 24 of female part 20. In other words, the plurality of protrusions 14 may be sufficiently spaced apart from the perimetral rim 19 of the first connector member 10 such that a perimetral rim 24 of the second connecter member 20, described below, may fit between the plurality of protrusions 14 and the perimetral rim 19 of the first connector member 10. At the same time, protrusions 14 are of sufficient height to ensure that the perimetral rim 19 of the first connector member 10 and the perimetral rim 24 of the second connector member 20 are proximate to each other as the two connector parts are rotated relative to one another. For example, the perimetral rim 19 of the first connector member 10 may rest on the perimetral rim 24 of the second connector member 20.

In some embodiments, the attached pair of connector members may be detached only by aligning the protrusion(s) and slot(s) and then pulling the two members apart. In some embodiments, the connector assembly may be configured to limit or reduce the potential for unwanted or accidental disassembly. For example, the first connector member and the second connector member may be detachable at only a single, unique orientation between the first member and the second member. In some embodiments, the plurality of protrusions are not all equally spaced apart around the cylindrical body of the first connector member, such that the plurality of protrusions align with the slots at a single orientation between the first connector member and the second connector member. By limiting the necessary alignment for detachment to a single orientation, the chances for accidental disassembly are significantly reduced.

The connector parts may be machined or molded from appropriate materials, and are preferably made of Polyvinyl Chloride (PVC). The assembly may have any suitable dimensions, for example the connected assembly may have a longest cross-sectional dimension (e.g., diameter). The connector parts may be attached to articles by any suitable known or later-discovered techniques. For example, the connector parts may be heat welded to the articles to which they are attached, for example, the plastic lounge and cushion described below in relation to FIG. 4.

According to one or more embodiments, the connector assembly, and systems or articles that incorporate the connector assembly, may be operated as follows. The one or more protrusions of the first connector member may be aligned with the one or more slots of the second connector member. The one or more protrusions may then be inserted into the one or more slots. The first member and the second member may be rotated relative to each other, bringing the protrusion(s) and slot(s) out of alignment and placing the protrusion(s) underneath the perimetral rim of the second member, and thereby securing or connecting the two connector members. While in the secured or connected state, the first connected member and second member may be rotated through a range of motion, including a full 360 degree range of motion according to some embodiments. The connector assembly may be further operated to detach the two connected members of the connector assembly. The process of detaching comprises reorienting the first connector member and the second connector member to realign the one or more protrusions of the first member from the one or more slots of the second member and withdrawing the first member from the second member. Methods of operating the connector assembly and systems or articles that incorporate the connector assembly, may incorporate any of the embodiments of the connector assembly.

Figure 4:
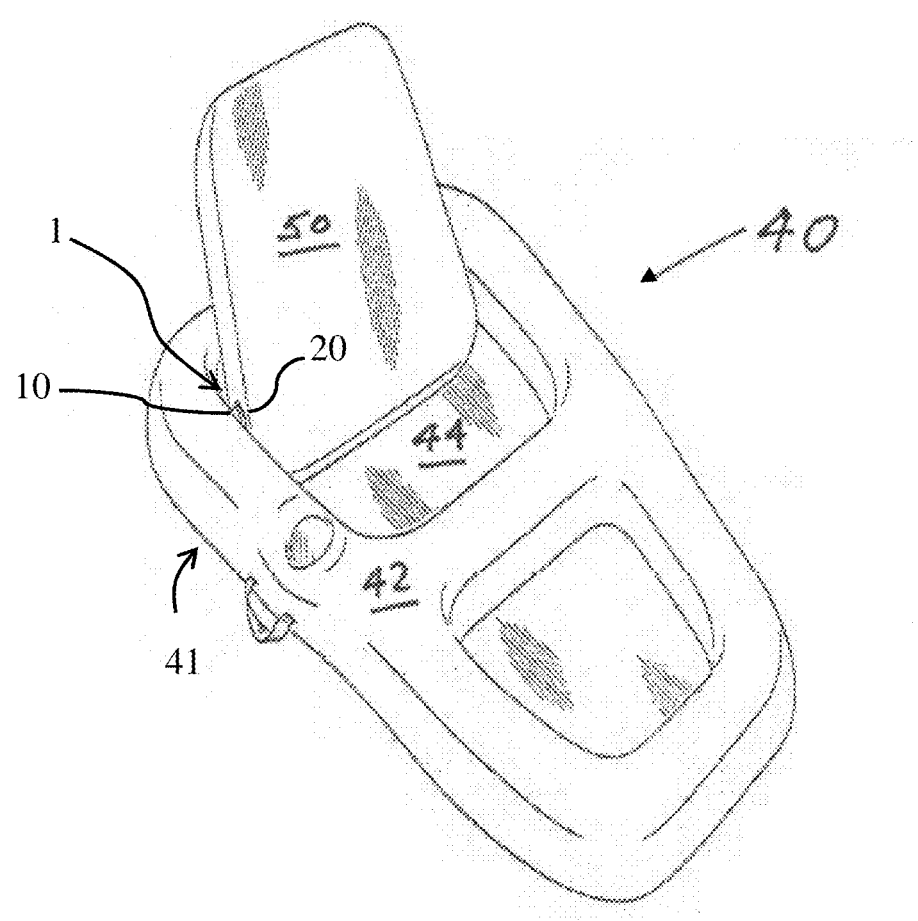
FIG. 4 illustrates one application of the rotatable connector assembly to allow adjustable rotation of a back support cushion that is detachably connected to the body of an inflatable lounge.

FIG. 4 depicts one example of an application or use of the instant connector assembly. An inflatable lounge 40 comprises an inflatable body 41 and an inflatable cushion 50, and a rotatable connector assembly 1 removably attaching the body 41 to the inflatable cushion 50. The body 41 may comprise an inflatable bladder 42 and a seating area 44. In the embodiment shown, the inflatable cushion 50 is removably attached by the connector assembly 1 to the body 41 at an inner portion of an inflatable bladder 42 on each side of a seating area 44 (with the connector assembly 1 on the left side of the cushion 50 out of view). In the embodiment shown in FIG. 4, the first connector member 10 (i.e., the male part) of the connector assembly 1 is attached to the body 41 and the second connector member 20 (i.e., the female part) is attached to the cushion 50. Alternatively, the first connector member 10 could be attached to the cushion 50 and the second connector member 20 could be attached to the body 41.

The cushion 50 may then be rotated about the two connector assemblies 1 to provide adjustable back support for the user of the inflatable lounge 40. In some embodiments, the plate 16 of the first connector member 10 may be affixed to the cushion 50, and the rim 28 of second connector member 20 may be affixed to the inflatable bladder so that when the two connector members 10 and 20 are mated, the cushion 50 may rotate freely without separation of the connector members 10 and 20 under load or shear forces, and the cushion 50 may be detached from the body 41 when desired.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A rotatable connector assembly, comprising:
   a first connector member comprising a cylindrical body having one or more protrusions extending radially therefrom and a perimetral rim extending from an upper edge of the cylindrical body, the perimetral rim comprising one or more cut-out areas, each of the one or more cut-out areas being positioned above one of the protrusions; and
   a second connector member comprising a cylindrical body having a perimetral rim at an upper edge of the cylindrical body, the perimetral rim having one or more slots therein for corresponding receipt of each of the one or more protrusions;
   wherein the one or more protrusions in the first connector member are configured to fit beneath the perimetral rim of the second connector member when the one or more protrusions are inserted fully into the one or more slots of the second connector member, so that the first connector member may be rotated relative to the second connector member.

2. The rotatable connector assembly of claim 1, wherein the one or more protrusions extend outwardly from the cylindrical body of the first connector member.

3. The rotatable connector assembly of claim 2, wherein the perimetral rim at the upper edge of the cylindrical body of the second connector member extends inwardly.

4. The rotatable connector assembly of claim 1, wherein the first connector member further comprises a plate proximate an upper edge of the cylindrical body of the first connector member.

5. The rotatable connector assembly of claim 1, wherein the one or more protrusions comprise a plurality of protrusions and the one or more slots comprise a plurality of slots.

6. The rotatable connector assembly of claim 5, wherein the plurality of protrusions are not all equally spaced apart around the cylindrical body of the first connector member, such that the plurality of protrusions align with the slots at a single orientation between the first connector member and the second connector member.

7. The rotatable connector assembly of claim 1, wherein the perimetral rim of the first connector member is configured such that when the one or more protrusions of the first connector member are fully inserted into the one or more slots of the second connector member, the perimetral rim of the first connector member is proximate to the perimetral rim of the second connector member.

8. The rotatable connector assembly of claim 1, wherein the perimetral rim of the first connector member is configured such that when the one or more protrusions of the first connector member are fully inserted into the one or more slots of the second connector member, the perimetral rim of the first connector member rests on the perimetral rim of the second connector member.

9. The rotatable connector assembly of claim 1, wherein the one or more protrusions are spaced apart from the perimetral rim of the first connector member.

10. The rotatable connector assembly of claim 1, wherein the one or more protrusions are sufficiently spaced apart from the perimetral rim of the first connector member such that the perimetral rim of the second connecter member may fit between the one or more of protrusions and the perimetral rim of the first connector member.

11. The rotatable connector assembly of claim 1, wherein the perimetral rim of the first connector member extends outwardly from the first connector member.

12. The rotatable connector assembly of claim 11, wherein the second connector member further comprises a ring portion proximate a lower edge of the cylindrical body of the second connector member.

13. An inflatable lounge, comprising
   an inflatable body;
   an inflatable cushion; and
   a rotatable connector assembly, comprising:
      a first connector member attached to one of the inflatable body and the inflatable cushion, the first connector comprising a cylindrical body having one or more protrusions extending radially therefrom and a perimetral rim extending from an upper edge of the cylindrical body, the perimetral rim comprising one or more cut-out areas, each of the one or more cut-out areas being positioned above one of the protrusions; and
      a second connector member attached to the other of the inflatable body and the inflatable cushion, the second connector comprising a cylindrical body having a perimetral rim at an upper edge of the cylindrical body, the perimetral rim having one or more slots therein for corresponding receipt of each of the one or more protrusions;
      wherein the one or more protrusions in the first connector member are configured to fit beneath the perimetral rim of the second connector member when the one or more protrusions are inserted fully into the one or more slots of the second connector member, so that the first connector member may be rotated relative to the second connector member.

14. The rotatable connector assembly of claim 13, wherein the one or more protrusions extend outwardly from the cylindrical body of the first connector member.

15. The rotatable connector assembly of claim 14, wherein the perimetral rim at the upper edge of the cylindrical body of the second connector member extends inwardly.

16. The rotatable connector assembly of claim 13, wherein the first connector member further comprises a plate proximate an upper edge of the cylindrical body of the first connector member.

17. The rotatable connector assembly of claim 13, wherein the one or more protrusions comprise a plurality of protrusions and the one or more slots comprise a plurality of slots.

18. The rotatable connector assembly of claim 17, wherein the plurality of protrusions are not all equally spaced apart around the cylindrical body of the first connector member, such that the plurality of protrusions align with the slots at a single orientation between the first connector member and the second connector member.

* * * * *